United States Patent [19]

Lerich

[11] 4,075,925
[45] Feb. 28, 1978

[54] SPRING ACTION EXPANSION BOLT

[75] Inventor: Lester Lerich, Broomfield, Colo.

[73] Assignee: Wej-It Expansion Products, Inc., Broomfield, Colo.

[21] Appl. No.: 701,414

[22] Filed: Jun. 30, 1976

Related U.S. Application Data

[62] Division of Ser. No. 422,537, Jan. 2, 1974, Pat. No. 3,967,525.

[51] Int. Cl.² .............................................. F16B 13/08
[52] U.S. Cl. ....................................... 85/64; 85/32 CS
[58] Field of Search ................. 85/64, 32 CS, 79, 8.8; 151/14 CS

[56] References Cited

U.S. PATENT DOCUMENTS

| 2,777,718 | 1/1957 | Vegren | 85/32 CS X |
| 3,316,795 | 5/1967 | Tann | 85/32 CS X |

Primary Examiner—Ramon S. Britts
Attorney, Agent, or Firm—John E. Reilly

[57] ABSTRACT

A masonry expansion bolt employs one or more resilient wires as the expansible wedging member which is positioned in annular grooves along the external surface portion of the bolt shank, the wedging member being selectively expansible in an outward radial direction into wedging engagement with the wall of the hole in which the bolt is inserted to firmly anchor the bolt in place in a positive and reliable manner.

1 Claim, 7 Drawing Figures

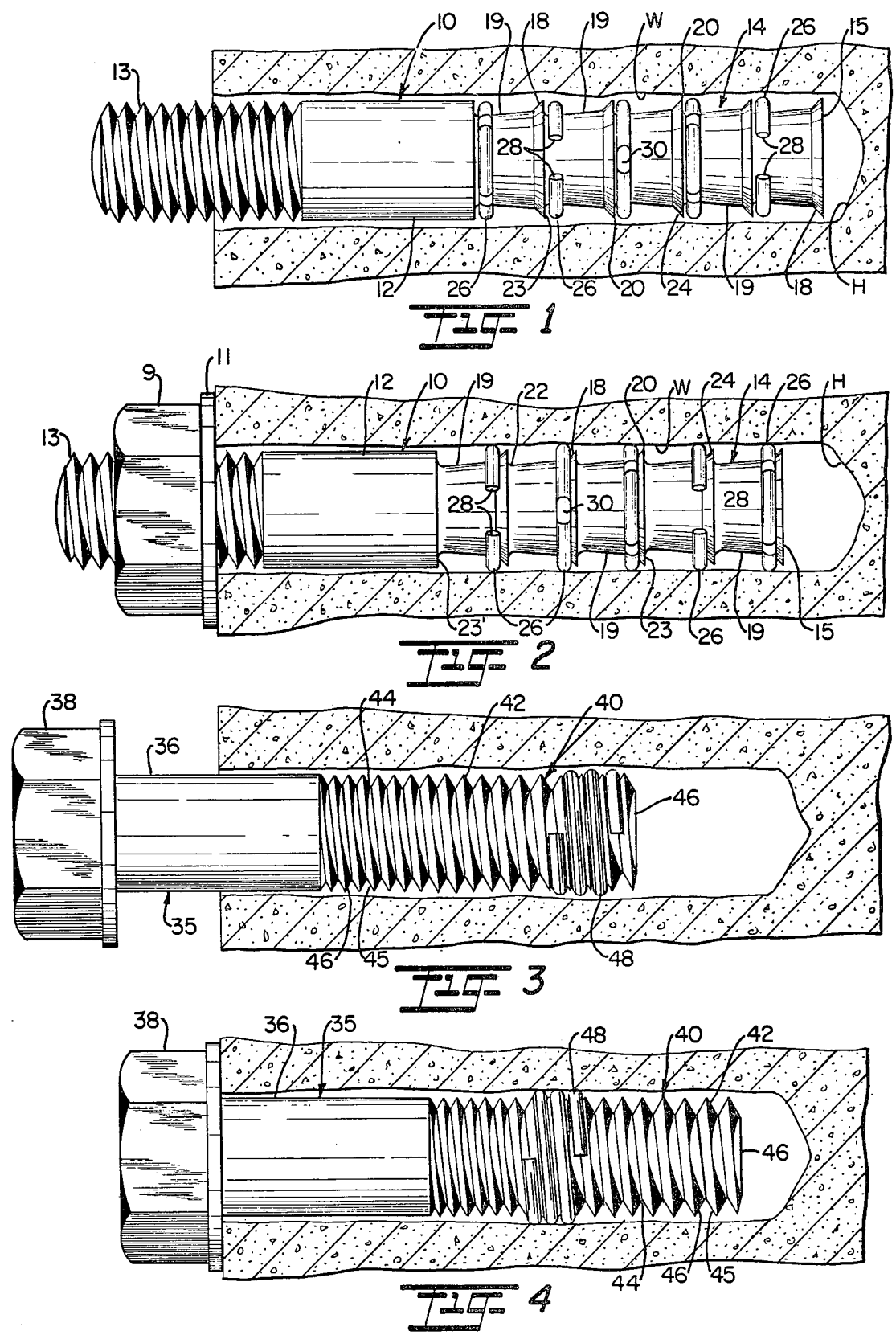

SPRING ACTION EXPANSION BOLT

This application is a division of Ser. No. 422,537, filed Jan. 2, 1974, U.S. Pat. No. 3,967,525, granted July 6, 1976 entitled SPRING ACTION EXPANSION BOLT.

The present invention relates to novel and improved fasteners, and more particularly relates to a spring action, wedge-type masonry expansion bolt of the type in which one or more resilient wires define a wedging member which will undergo outward radial expansion into firm anchored engagement with the wall of a bolt hole.

Numerous types of expansion bolts have been devised for anchoring structural members in masonry or rock materials and the like. Representative of this type of bolt are the various forms of masonry expansion bolts disclosed in U.S. Pat. No. 3,257,891 to Lester Lerich entitled WEDGE-TYPE EXPANSION BOLT and wherein wedging members loosely assembled in external recesses on the shank of the bolt are normally positioned to lie substantially within the preipheral surface of the bolt as the bolt is inserted into the bolt hole; and when the bolt is tightened within the hole, the wedging members will automatically slide outwardly along the external recesses into firm anchored engagement with the wall of the hole. While these and other bolts of the type described have been found to be highly effective in commercial use and practice, there are applications where it is desirable to provide for a masonry expansion bolt which will permit utilization of simplified forming and assembly operations with low-cost parts and specifically with a low cost wedging member in the form of a resilient wire which is automatically displaceable into uniform wedging engagement within the bolt hole.

It is therefore an object of this invention to provide for a novel and improved wedge-type expansion bolt specifically adapted for use in anchoring members in masonry or rock materials.

Another object of the present invention is to provide for a novel and improved masonry anchor having a spring wire wedging member so positioned and arranged as to be rapidly and automatically displaceable into uniform wedging engagement with the wall of an opening either as the bolt is inserted into the hole or as the bolt is tightened in the direction of withdrawal from the hole.

A further object of the present invention is to provide for a novel and improved masonry anchor provided with spring action wedging elements which are responsive to rotation of the bolt within the hole to be automatically displaceable into anchored engagement with the hole.

It is a still further object of the present invention to provide for a novel and improved masonry anchor bolt in which one or more resilient wire elements are so positioned and arranged on the external surface of the bolt shank as to be automatically and selectively expansible into wedging engagement with the wall of the hole when the shank is urged in the direction of withdrawal from the hole.

It is a still further object of the present invention to provide in a masonry anchor bolt for a novel and improved spring action wedge member which is automatically displaceable in an outward radial direction and in such a way as to effect full circumferential wedging engagement with the wall of the hole at uniformly spaced intervals along at least a portion of the length of the bolt.

In accordance with the present invention there has been devised an improved form of spring-action expansion bolt in which a bolt of a given size or diameter can be anchored in different sized openings within limits, the expansion bolt being of simple and inexpensive construction and including improved wedging means preferably in the form of a resilient wire disposed in the annular grooves separating the threads along a threaded section of the bolt. The resilient wire wedging means may either be in the form of one or more split annular rings or in the form of a spiral coil preferably having a number of turns less than the number of threads on the bolt; and in either case the wire means is so dimensioned that when positioned within the annular grooves separating the threading on the bolt will be resiliently urged outwardly under its spring tension into contact with the wall of the hole. In certain forms of the invention to be hereinafter described, as the bolt is inserted into the hole, the resilient wire wedging means will be urged into the deeper portion of the groove; and, when the bolt is then drawn or pulled outwardly in the direction of withdrawal from the hole, the contact between the wedging means and the wall of the hole will cause the wedging means to slide forwardly along divergent bearing surfaces into firm anchored engagement with the wall of the hole to firmly anchor the bolt in place. In another form of invention, the threading on the bolt is tapered forwardly toward the leading end of the bolt and the resilient wire urging means will be caused to travel or rotate rearwardly away from the leading end of the bolt so as to undergo increasing expansion as a result of the progressively increased diameter of the threading until it is anchored firmly in engagement with the wall of the hole.

In still another version of the present invention, the resilient wire-wedging means is so positioned and arranged with respect to the threaded portion on the expansion bolt that it will be caused to undergo circumferential expansion or unwinding as the bolt is threaded or rotated in a direction opposing the spiral direction of the wedging means. For example, if the resilient wire has a right-hand helix and is anchored at its trailing end, rotation of the bolt in a clockwise direction will cause the righthand spiral wire to be expanded outwardly as it engages the wall of the hole when the bolt is threaded or rotated into the hole.

In still another form of expansion bolt, in accordance with the present invention, the wedging means is defined by a resilient wire having a polygonal cross-section so that the wire can be normally disposed against a flat surface in the deeper portion of the annular groove separating the threading and can be selectively tipped into a shallow notch in the deeper portion of the groove causing its diagonal dimension which is of greater thickness to project outwardly in a radial direction from the groove into firm wedging engagement with the wall of the hole as the bolt is threaded or screwed into the opening. Accordingly, it will be appreciated from the foregoing and from the detailed description of preferred and modified forms of invention which follow that the specific configuration of the threading and associated grooves as well as that of the wire may be modified to some extent to accomplish different desired objectives dependent upon the intended application of each form of bolt. While each form contains separate and distinct patentable features it will be further recognized that all are characterized by ease of assembly of the wedging means onto a bolt having either standard or special threading to accommodate the wedging means, and the resiliency of the wedging means is such as to permit rapid automatic displacement into firm engagement with the wall of the hole. At the same time, the resilient wire wedging means is capable of effecting not only uniform circumferential wedging engagement with the wall of the hole but of effecting such engagement at axially spaced intervals or continuously in a spiral direction along a substantial length of the hole.

The above and other objects, advantages and features of the present invention will become more readily understood and appreciated from a consideration of the following description of the preferred and alternate forms of the present invention when taken together with the accompanying drawings, in which:

FIG. 1 is an elevational view partially in section illustrating installation of a preferred form of expansion bolt, in accordance with the present invention, in a drilled hole formed in a masonry wall.

FIG. 2 is a view similar to FIG. 1 showing the preferred form of invention in anchored relation within the hole.

FIG. 3 is an elevational view illustrating installation of an alternate form of the present invention in a drilled hole.

FIG. 4 is an elevational view of the form of invention shown in FIG. 3 in anchored relation to the hole.

Figure 7:
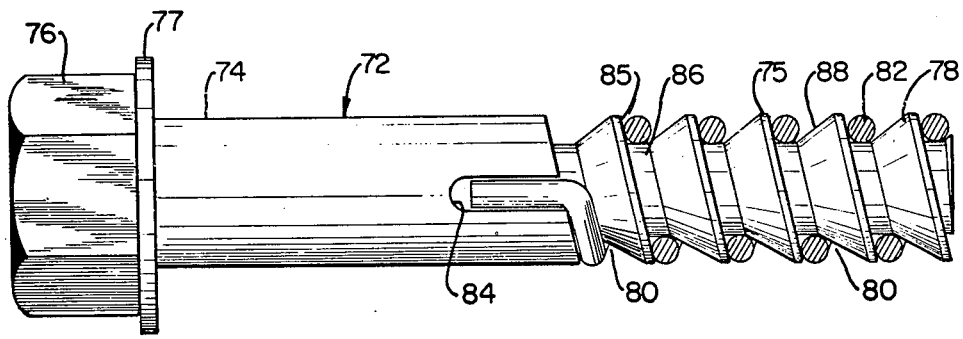
FIG. 7 is a detailed sectional view illustrating the particular manner of expansion of the wedging means shown in FIG. 6 into anchored relation to the wall of a hole.

Referring in more detail to the drawings, one preferred form of expansion bolt 10 is illustrated in FIGS. 1 and 2 and is seen to comprise an elongated cylindrical shank 12 having a threaded end portion 13 at its external or trailing end and a wedging assembly generally designated at 14 extends for approximately one-half the total length of the bolt along the forward portion of the bolt and terminates at the leading end portion 15. The bolt assembly is completed by a washer 11 and nut 9 which are employed to tighten the bolt in the hole by automatic displacement of the wedging assembly into anchored engagement with the surrounding wall surface W of the drilled hole H.

In the form of invention shown in FIGS. 1 and 2, the wedging assembly 14 consists of ridge portions defined by axially spaced, forwardly divergent surface projections 18 separated by annular grooves 19 throughout the length of the wedging assembly. Although not essential, the projections 18 extend circumferentially for a full 360° around the external surface of the shank, and the distance or spacing between threads 18 is uniform along the length of the assembly. Each thread is generally V-shaped in cross-section and terminated in an outer pointed or sharply tapered circumferential extremity 20 which is of a diameter equal to that of the greater diameter of the shank 12.

Each of the annular grooves 19 includes a deeper surface portion 22 which diverges forwardly at a low gradual angle from a stepped or shoulder portion 23 on one side of a thread 19 and a second bearing surface 24 which diverges forwardly at a steeper angle and forms the opposite side of each thread 18 to that of the shoulder surface 23. In addition, the trailing groove of grooves 19 terminates in a stepped surface 23' which merges into the main body of the shank portion 12.

The wedging assembly is completed by a plurality of wedging means 26 each in the form of an annular ring of circular cross-section which is disposed in one of the annular grooves 19 behind the 18. Each of the annular rings includes split end portions 28 and a flattened surface portion 30 diametrically opposite to the split end portions 28. Most desirably, the cross-sectional diameter of each ring 26 corresponds to the depth of the annular groove at its deepest point which in this case is directly adjacent to the stepped surface or shoulder portion 23. In addition, each ring is given some limited resiliency so that when it is placed on the bolt by expanding at the split end portions and passed over the surface of the bolt it will be sprung outwardly away from snug-fitting engagement with the surface of the groove to a limited extent. The flattened surface portion 30 diametrically opposite the split end portion 28 of the ring will permit ease of flexing at that point in expanding the ring and returning it to a retracted position but again spaced somewhat outwardly of the deeper surface portion of the groove so that its effective circumference or diameter on the bolt will be slightly greater than the diameter of the bolt itself. As a result, when the bolt is inserted into the hole, each ring will be forced rearwardly into the deeper portion of the groove and sprung inwardly by the force applied by the wall of the hole so as not to interfere with full insertion of the bolt to the desired depth of the drilled hole. However, when the bolt is tightened by threading the nut 9 forwardly along the threaded portion 13 of the bolt, the resiliency of the rings is such that they will be automatically displaced by frictional engagement with the hole forwardly along the deeper bearing surface 22 so as to be expanded outwardly into firm positive engagement with the wall of the hole. Depending on the exact size or diameter of the hole, the rings 26 may undergo continued expansion as they are forced outwardly along the bearing surfaces 24. Accordingly, the annular rings will effect substantially complete circumferential engagement with the wall of the hole at spaced intervals from the leading end of the bolt over the greater length of the inserted portion of the bolt in a hole.

In an alternate form of expansion bolt shown in FIGS. 3 and 4 the bolt member 35 is in the form of a screw anchor having a shank portion 36, a headed external end 38 and externally threaded section 40 which extends the greater length of the shank portion of the bolt. The threaded section 40 forms a part of the wedge assembly of this modified form of bolt and has helical threads thereon. The threaded portions 42 are generally V-shaped in cross-section to define corresponding V-shaped annular grooves 44 therebetween, each annular groove having a forwardly divergent bearing surface 45 and rearwardly divergent bearing surface 46 defining opposite sides of each threaded portion 42. In addition, the threaded section 40 tapers forwardly from the shank portion 36 toward the leading end 46; or in other words, the threading is of progressively increasing diameter from the leading end 46 to a maximum diameter corresponding to the diameter of the shank portion 36.

In the modified form shown in FIGS. 3 and 4, the wedging means takes the form of a coiled or a spiral spring wire 48 made up of a number of turns less than the threaded portions and where the cross-sectional size of the wire is such that it will fit within the annular groove 44 with the external surface of the wire 48 projecting slightly beyond the outer periphery of the threaded portions when positioned along the section of lesser diameter at the leading end so as to assure initial frictional engagement with the wall of the hole. Thus, when the screw anchor is inserted into a drilled hole H and is caused to undergo inward threading or rotation, the wedging means 48 which is initially positioned at the leading end of the threaded section 40 would travel in a rearward direction along the annular grooves 44 away from the leading end as a result of the frictional contact with the wall of the hole and, due to the increasing diameter of the threaded portion rearwardly toward the shank, the spring wedging means will be caused to undergo gradual expansion, as illustrated in FIG. 4, until it effects positive anchored engagement with the wall of the hole. In addition, the wedging means will exert somewhat greater pressure against the forwardly divergent bearing surfaces 45 to assure positive anchored engagement with the wall of the hole, since the anchor when tightened in the hole will be under tension which will apply force in the direction of withdrawal from the hole causing the wedging means to bear more firmly against the bearing surfaces 45. Of course the threading may be either righthand or lefthand and the screw anchor must be threaded or rotated into the hole in a direction which will cause the wedging means to travel in the opposite direction by frictional engagement with the wall of the hole. Where the turns of wire are as in this form substantially less than the number of threads on the threaded section, according to the diameter of the hole, the wedging means 48 can be positioned initially and assembled at any desired point on the threaded section prior to insertion of the hole to insure frictional contact with the hole which will cuase its rearward travel as the screw anchor is tightened in the hole.

Figure 5:
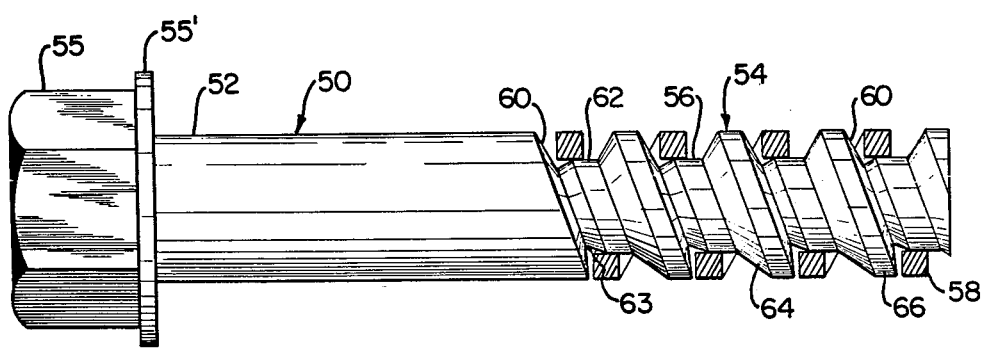
FIG. 5 is an elevational view of a modified form of invention and further illustrating in dotted form outward expansion of the wedging means as the bolt is threaded into a drilled hole.
Figure 6:
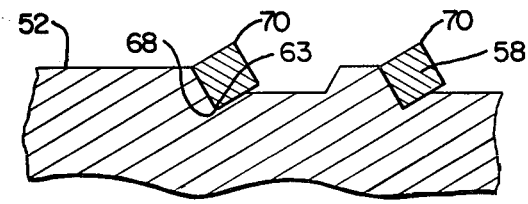
FIG. 6 is an elevational view of still another modified form partially in section prior to installation in a drilled hole.

In another modified form of invention shown in FIGS. 5 and 6, the modified form of expansion bolt 50 once again takes the form of a screw anchor having a shank portion 52 which terminates at its leading end in a threaded section 54 and has an enlarged head 55 at its external or trailing end, together with a separate washer 55'. Again the threaded section 54 forms a part of a wedging assembly, each threaded portion 54 being of generally truncated, V-shaped cross-section separated by relatively broad annular grooves 56 for placement of resilient wire wedging means 58 therein.

It will be noted that each annular groove includes a radially extending shoulder portion 60, an axially extending surface portion 62 which is separated from the shoulder surface 60 by a notch 63, and a forwardly divergent bearing surface portion 64 which forms one side of the threaded portions 54. The opposite side of the threaded portions 54 is defined by the shoulder surface 60 and the external surface of each threaded portion is defined by a relatively flat outer peripheral surface 66.

The resilient wire wedging means 58 is again defined by a spring wire preferably having a number of turns less than the number of threads 54 and has a square cross-section, as best seen from FIG. 6, which is of a thickness when normally disposed against the axial surface portion 62 of the groove to be extended slightly beyond the outer peripheral outline of the bolt.

When the bolt is threaded into a drilled hole of a diameter corresponding substantially to that of the bolt, frictional engagement of the wedging means 58 with the wall of the hole will cause the one corner 68 of the wire to be tipped rearwardly into the notched portion 63 of the annular groove and to tip the opposite diagonal corner 70 upwardly away from the grooves. Accordingly, the effective thickness of the wire will be increased as the wire is tipped or cocked outwardly and wedged or anchored more firmly into the wall of the hole. If desired, the threaded section 54 of the bolt may be tapered in the same manner as described with reference to FIGS. 3 and 4 so that as the bolt is threaded into the drilled hole the wire will be caused to travel rearwardly along the threaded sections and to expand both circumferentially and by tipping into the shallow notch of the annular groove to increase the degree of anchored engagement with the hole.

Still another modified form of the present invention is shown in FIG. 7 wherein an expansion bolt 72 has a bolt shank 74, threaded section 75 at its leading end and a head 76 at its trailing or external end with a separate washer element 77. The threaded section 75 is made up of helical threads 78 separated by annular grooves 80. The configuration of the threading and annular grooves is modified in this form to some extent to accommodate a resilient wire wedging means 82 of a length to extend substantially the full length of the threaded section, and an axially directed, open slot 84 is provided in the external surface of the shank portion 74 in communication with the first annular groove 80 of the threaded section to receive an axially extending terminal end portion 83 of the wedging means 82.

Considering the specific configuration of the annular grooves 80, it will be noted in this form that each includes a shoulder surface portion 85 and, an axial surface portion 86 forming a deeper portion of the groove which merges into a forwardly divergent bearing surface portion 88 along one side of each of the threaded portions 78.

The resilient wire wedging means 82 is of circular cross-section and of a diameter corresponding to, or slightly greater than, the depth of the groove, the means 82 having sufficient spring force to cause it to project outwardly from the groove when disposed in the deeper portion to a slight extend beyond the peripheral outline of the threaded portion 78.

As the bolt is threaded into a drilled hole corresponding substantially to the diameter of the bolt, and in a direction counter to the spiral direction of the extension of the wire within the groove, the wire will be caused to expand in a circumferential direction away from the deeper portion of the groove, since its terminal end 84 will lock the wire against any travel along the surface of the annular groove. Alternately, in this form, a separate nut may be positioned on the external end in place of the headed portion 76 so that as the nut is tightened the wire 82 will prevent turning of the bolt in the hole as it is inserted but will be free to slide forwardly along the surface of the groove until it is expanded into anchored engagement much in the manner of the form of FIGS. 1 and 2.

Although the present invention has been described with a certain degree of particularity, it is understood that the present disclosure has been made by way of example and that changes in details of structure may be made without departing from the spirit thereof.

What is claimed is:

1. A masonry expansion bolt adapted to be anchored within a bolt hole comprising:

an elongated shank portion of generally circular cross-section having a diameter equal to or slightly less than that of the bolt hole, a wedging section extending at least along a portion of said shank including a plurality of peripheral ridges in longitudinally spaced relation to each other, the space between adjacent of said ridges being in the form of an annular channel of generally trapezoidal cross-section with an inner surface parallel to and concentric with the longitudinal axis of said bolt, a forward side inclined radially outward at an obtuse angle to said inner surface, and a rearward side also inclined radially outward at an obtuse angle to said inner surface, said channel also having an annular groove of generally V-shaped cross-section recessed into its inner surface at its rearward side, the rearward side of said V-shaped groove being an extension of the rearward side of said channel inclined radially inwardly in the same plane as said rearward side of said channel, and the forward side of said V-shaped groove diverging away from the rearward side at a right angle thereto, and resilient wedging means in the form of an annular wire ring of substantially square cross-section normally disposed in said channel forwardly of said groove with one of its flat sides positioned adjacent and parallel to the inner surface of said channel, the crosssectional dimension of said wire between opposite of its flat sides being greater than the depth of said channel, said wire ring also being slidable longitudinally rearwardly in said channel in response to urging in that direction of force applied to its outer periphery and rotatable about its annular longitudinal axis in response to limiting resistance to said rearward sliding movement on its inner rearward edge by said inclined rearward side of said channel such that said inner rearward edge is rotatable into and retained by said V-shaped groove in a position with its outer forward edge rotated to protrude radially outward beyond the peripheral surface of said bolt into engagement with the walls of said hole with said one flat side of said wire ring bearing against said forward side of said V-shaped groove to restrain said bolt from longitudinal retraction from said hole, the diagonal dimension of said substantially square cross-section being greater than the combined depths of said channel said v-shaped groove by an amount which is more than the difference between said dimension between the opposite flat sides and the depth of the channel, said wedging section being in the form of a threaded section in which said channel extends spirally therealong, and said wedging means is defined by a number of turns of a coiled spring wire extending along said channel.

* * * * *